Nov. 19, 1963    R. E. ALLENBACH    3,111,004
TIMER FOR CLINICAL THERMOMETER
Filed Dec. 14, 1962
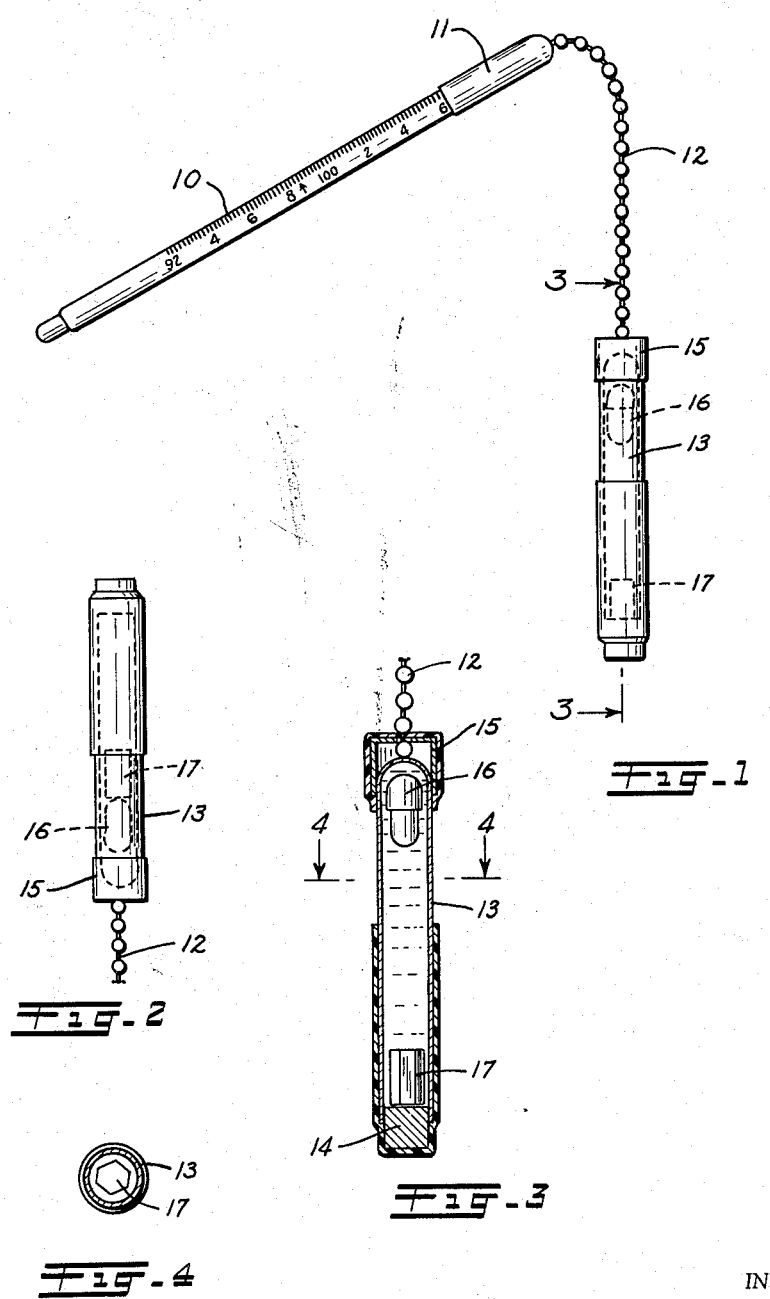
INVENTOR.
ROY E. ALLENBACH
BY
ATTORNEY United States Patent Office

3,111,004
Patented Nov. 19, 1963

3,111,004
TIMER FOR CLINICAL THERMOMETER
Roy E. Allenbach, 1320 N. Main St., Pueblo, Colo.
Filed Dec. 14, 1962, Ser. No. 244,826
4 Claims. (Cl. 58—144)

This invention relates to a timer for timing the length of time a clinical thermometer has been in place in the mouth of a patient. Its intended use could be of great benefit in hospitals, clinics, doctors' offices and institutions or even in the home.

It is exceedingly time consuming for a nurse, technician or housewife to wait at the bedside or examining table while the thermometer of a patient is attaining the correct body temperature. As a result they can pass on to other duties and/or to other patients placing a thermometer in the mouth of each. In an institution or hospital with a large number of patients and with many extraneous duties, it becomes difficult to know that each thermometer has been in place a sufficient time to give a correct reading of the patient's temperature.

The principal object of this invention is to equip the clinical thermometers with an automatic timing device which will automatically give a reading of the elapsed time and which actuates a visible signal which will be easily visible even from a distance, and instantly determine that the thermometer or thermometers are ready for removal, reading and recording.

Another object is to provide a timer of the above type which will be exceedingly economical to manufacture, which will have no exposed working parts and which will require no attention other than a resetting for each use which can be quickly accomplished by a simple inversion of the timer before use.

A further object is to provide a single accurate visual timing device which can be quickly attached to and directly and freely suspended from a clinical thermometer without interfering in any way with the normal use and sterilization of the thermometer.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 illustrates the timer suspended in operating position from a conventional clinical thermometer;

FIG. 2 illustrates the timer in the inverted or reset position;

FIG. 3 is a longitudinal axial section through the timer taken on the line 3—3, FIG. 2 and FIG. 4 is a cross section looking downwardly on the line 4—4, FIG. 3.

A conventional clinical thermometer to which this invention applies is illustrated and designated by the numeral 10. The timer is designed to be suspended from a cap 11, slipped over the upper extremity of the thermometer 10, by means of a flexible element such as a flexible, bead chain 12. The cap 11 may be formed of any suitable material for receiving and frictionally engaging the thermometer such as flexible plastic.

The timer comprises a transparent glass or plastic tube 13 having an upper permanently closed extremity and a lower extremity closed by a suitable sealing plug 14. A tube cap 15 is cemented to or otherwise attached to the closed upper extremity to, or in which, the chain 12 is attached. The lower portion of the tube 13 is encased in an opaque, or colored sleeve 16 so that an open, transparent upper portion of the tube is exposed between the sleeve 16 and the tube cap 15 through which the interior of the tube is visible.

The tube is completely filled with a relatively low viscosity fluid of a type having an extremely high vaporization point, an extremely low freezing point and low expansive characteristics such as a light refined petroleum or vegetable oil. In actual use, a vegetable oil known as "Crisco" has been found to be satisfactory. However, any similar light weight, low viscosity, transparent fluid should serve the purpose.

A closed capsule 16 and metallic return weight 17 are enclosed in the fluid in the tube. The capsule 16 is filled with the same fluid as the tube.

The resetting weight is formed from metal and is not cylindrical so as to allow free fluid passages between the weight and the interior of the tube. A hexagonal shape has been found satisfactory.

The timer is assembled by cementing or otherwise fixedly mounting the tube cap 15 on the closed extremity of the tube 13. The filled capsule 16 is then placed in the tube followed by the resetting weight 17. The tube is then completely filled with fluid and the sealing plug 14 is inserted. The lower portion of the tube is now dipped in any suitable air curing opaque fluid such as liquid plastic, latex, or quick drying enamel to form the opaque sleeve 16 and the upper portion is similarly dipped to cement the tube cap 15 in place and to leave an open space between the cap and the sleeve of predetermined length.

It is believed the use is apparent from the above. Briefly, the timer is inverted to the position of FIG. 2 to allow the weight to rapidly force the capsule to the closed extremity of the tube. The thermometer is then inserted in the patient's mouth with the timer freely suspended therefrom. When the timer resumes its upright position, the weight 17 will rapidly settle to the plug 14 due to its high specific gravity and to the free fluid flow between it and the tube.

The capsule will slowly descend in the tube, the displaced fluid flowing slowly upwardly betwen the tube wall and the capsule. In actual practice, the viscosity of the fluid, the weight of the capsule and its coloring medium and the relative difference in diameters between the capsule and the internal diameter of the tube is such that the capsule will disappear below the upper extremity of the sleeve 16 at the expiration of three minutes. Thus, a glance at the timer will give an immediate approximation of the time the thermometer has been in place in the mouth of the patient.

While a specific form of the invention has been described and illustrated herein, it is to be understood that the same may be varied, within the scope of the appended claims, without departing from the spirit of the invention.

Having thus described the invention, what is claimed and desired to be secured by Letters Patent is:

1. A timer for a clinical thermometer comprising: a tube having a closed upper extremity; a signal element in said tube; a weighted element in said tube below said signal element; a fluid filling said tube; and a plug closing the lower extremity of said tube, so that when said timer is inverted said weighted element will force said signal element toward said closed extremity and when said timer is righted said weighted element will rapidly descend toward said plug and said signal element will slowly descend toward said weighted element.

2. A timer for a clinical thermometer as described in claim 1 having means for attaching the upper extremity of said tube to said thermometer.

3. A timer for a clinical thermometer as described in claim 2 in which the upper portion of said tube is transparent to allow visual observation of said signal element and in which the lower portion of said tube is less transparent so as to tend to conceal said signal element when the latter has descended a predetermined distance.

4. A timer for a clinical thermometer as described in claim 3 in which the means for attaching comprises a tube cap fitted over and secured on the closed extremity of said tube, a thermometer cap adapted to be slipped over the upper extremity of said thermometer and a flexible element connecting said two caps together.

References Cited in the file of this patent

UNITED STATES PATENTS

| | | |
|---|---|---|
| 1,641,343 | Maynard | Sept. 6, 1927 |
| 3,025,665 | Dock et al. | Mar. 20, 1962 |